W. P. KINSELLA.
DECANTING DEVICE.
APPLICATION FILED FEB. 26, 1909.
949,019.
Patented Feb. 15, 1910.
2 SHEETS—SHEET 1.
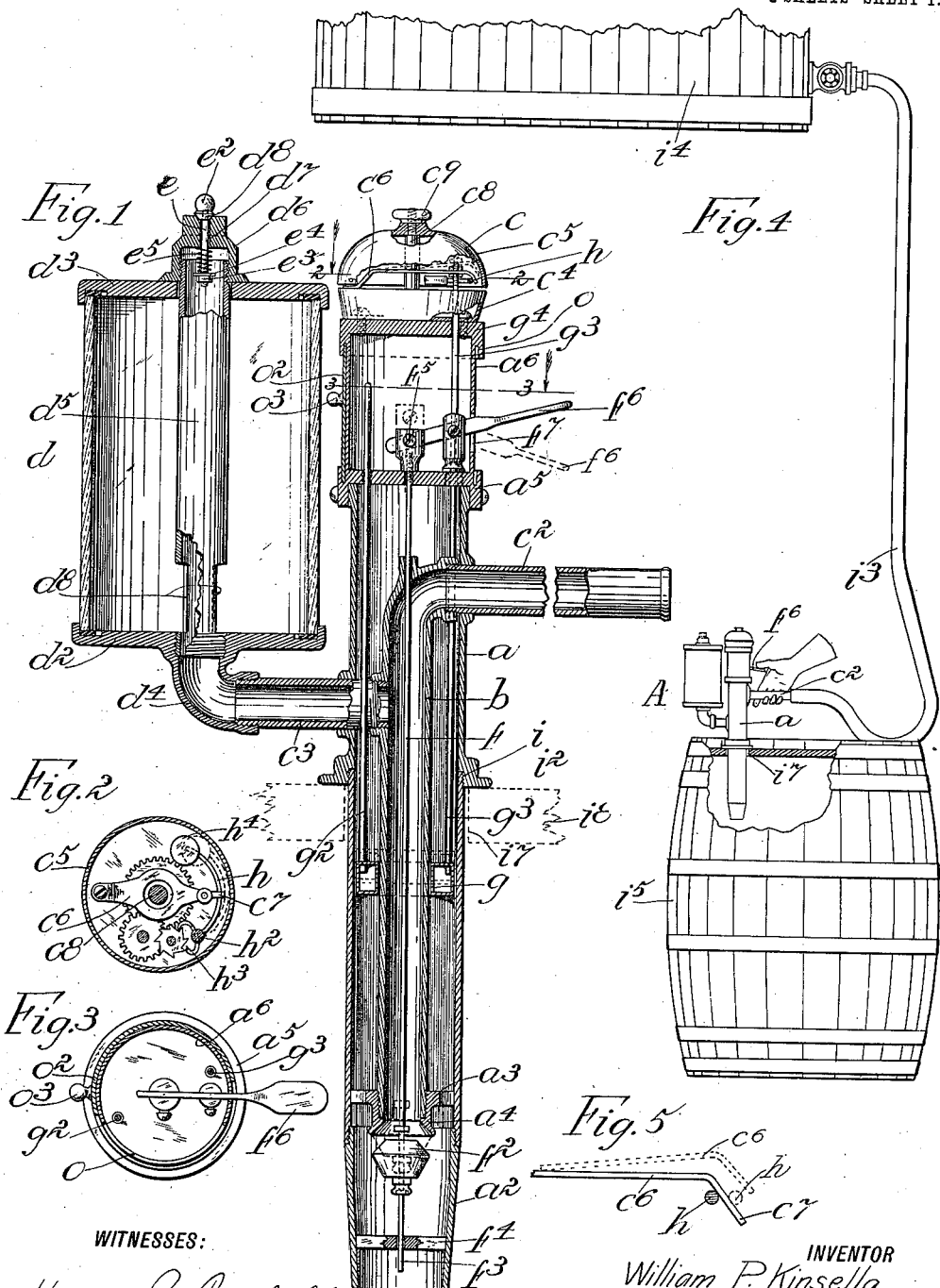
WITNESSES:
Harry P. Canfield
C. E. Mulvany
INVENTOR
William P. Kinsella
BY Edgar Tate & Co.
ATTORNEYS.

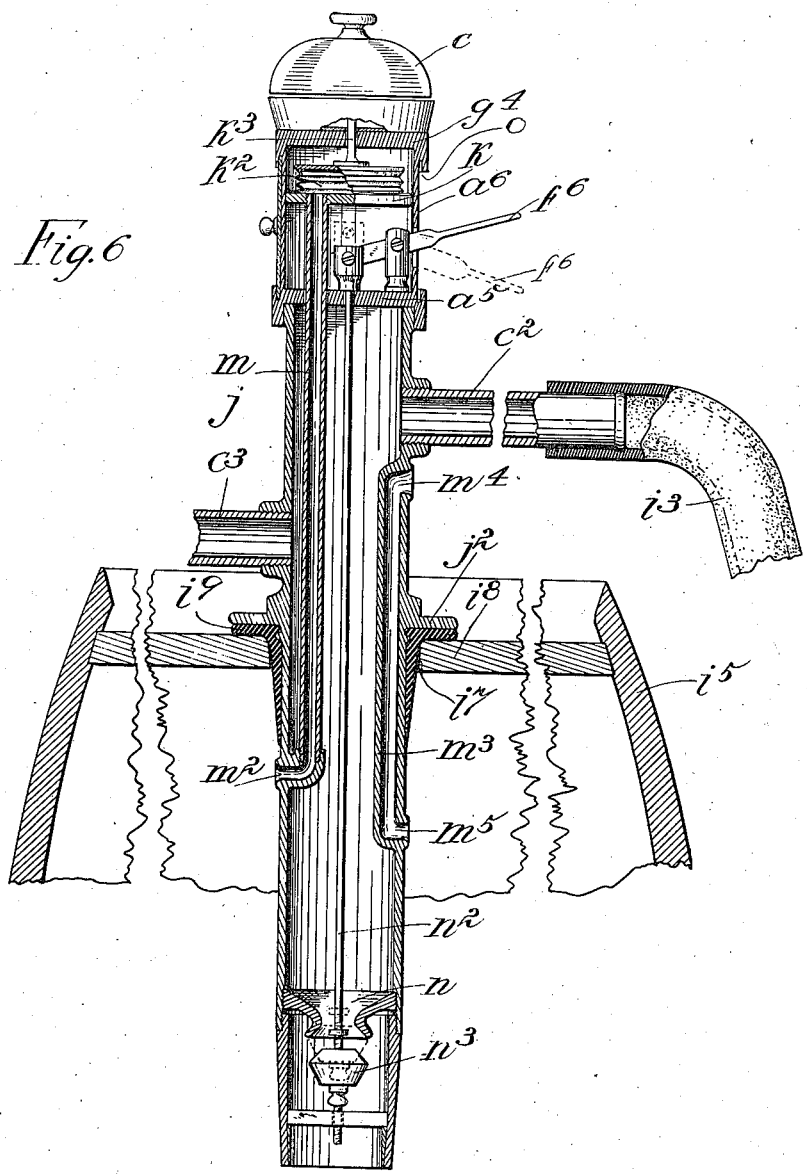

UNITED STATES PATENT OFFICE.

WILLIAM P. KINSELLA, OF BROOKLYN, NEW YORK.

DECANTING DEVICE.

949,019. Specification of Letters Patent. Patented Feb. 15, 1910.

Application filed February 26, 1909. Serial No. 480,229.

*To all whom it may concern:*

Be it known that I, WILLIAM P. KINSELLA, a citizen of the United States, and residing at Brooklyn, in the county of Kings and State of New York, have invented certain new and useful Improvements in Decanting Devices, of which the following is a specification, such as will enable those skilled in the art to which it appertains to make and use the same.

This invention relates to devices for use in decanting liquids; and the object thereof is to provide an improved device of this class which will operate automatically and by means of which the liquids may be tested as to clearness or otherwise before being transferred from a tank or receptacle into a cask or other receiver.

The invention is fully disclosed in the following specification, of which the accompanying drawings form a part, in which the separate parts of my improvement are designated by suitable reference characters in each of the views, and in which;—

Figure 1 is a sectional side elevation of my improved decanting device; Fig. 2 a partial horizontal section of an alarm device which I employ, Fig. 3 a section on the line 3—3 of Fig. 1, Fig. 4 a view showing the use or operation of my improved decanting device, Fig. 5 a detail of part of Fig. 1, and;—Fig. 6 a view similar to Fig. 1 but showing a modification.

In the practice of my invention as shown in Figs. 1, 2 and 3 I provide a decanting device A which is of the following construction.

Placed concentrically within a main tube $a$ is a supplemental tube $b$, and the tube $b$ is somewhat shorter than the main tube $a$, and the main tube is preferably provided at its lower end with an extension $a^2$ which, in the form of construction shown, is slightly tapered and the lower end portion of the tube $b$ is centered in the tube $a$ by a spider-work device $a^3$, at the lower end of which is a valve seat $a^4$.

The upper end of the tube $a$ which extends slightly above the tube $b$ is closed by a cap $a^5$ with which is connected a tubular casing $a^6$ which forms an extension of the tube $a$ and on the top of which is placed an ordinary spring operated alarm device $c$.

The upper end of the tube $b$ is turned at right angles to the axis thereof, in the form of construction shown, and passing through the side of the main tube $a$ is a tube $c^2$ which is connected with the supply tube $a$ as shown and at a predetermined point below the top of the tube $b$ and on the side thereof opposite the tube $c^2$, in the form of construction shown, another tube $c^3$ is passed through the tube $a$, and connected therewith is a sight testing device $d$ consisting of a receptacle the body portion of which is composed of glass and provided with a bottom $d^2$ and top $d^3$.

The bottom $d^2$ is connected with the tube $c^3$ by means of a tubular neck $d^4$, and passing vertically through the testing device $d$ is a tube $d^5$ the upper end of which passes through the top $d^3$ and is closed by a supplemental cap $d^6$ provided with a vent device comprising a vertically arranged opening $d^7$ in said cap and provided at the top thereof with a valve seat $d^8$ and through which passes a vertically movable pin $e$ provided at its upper end with a knob $e^2$ which serves as a valve and at its lower end with a nut $e^3$ on which is placed a washer $e^4$ between which and the cap $d^6$ is placed a spiral spring $e^5$, and any considerable pressure in the tube $d^5$ will raise the pin $e$ and open the passage $d^7$, and the lower end of the tube $d^5$ is provided with side openings $d^8$.

Passing vertically through the inner tube $b$ and the main tube $a$ is a rod $f$ the lower end of which projects below the tube $b$ and is provided with a valve $f^2$ adapted to operate on the valve seat $a^4$ to close the lower end of the tube $b$, and said valve is provided with a downwardly directed rod $f^3$ which passes through a spider work $f^4$ and serves as a guide for said valve.

The upper end of the rod $f$ passes through the upper end of the tube $b$ and through the cap $a^5$, and pivoted thereto at $f^5$ is a lever $f^6$ which passes outwardly through a vertically arranged aperture $f^7$ in the tubular casing $a^6$, and by means of which the rod $b$ may be raised when desired.

Within the annular space between the tubes $a$ and $b$ is placed a vertically movable float $g$, and connected with said float are two vertically arranged rods $g^2$ and $g^3$, and these rods are both freely movable through the cap $a^5$.

The upper end of the casing $a^6$ is closed by a cap $g^4$ and the rod $g^3$ passes loosely therethrough and is adapted to operate, or cause the operation of the alarm device.

The alarm device $c$ comprises a bottom member $c^4$ and a top member $c^5$ and the spring of said device is placed in the bottom member $c^4$, and secured in one side of said device is a spring arm $c^6$ which ranges transversely thereof and with which the rod $g^3$ is connected.

The hammer arm $h$ of the alarm device $c$ is pivoted at $h^2$ and provided with an escapement $h^3$ at one end and with a hammer $h^4$ at the other, and the spring arm $c^6$ is provided at its free end with an outwardly and downwardly directed finger $c^7$ which operates in connection with the hammer arm $h$, and when said parts are in their normal position the alarm device cannot operate, but when the float $g$ is raised the spring arm $c^6$ is thrown into the position shown in dotted lines in Fig. 5 and the alarm device is free to operate.

The alarm device $c$ is provided with a shaft $c^8$ which is secured in the bottom thereof and passes vertically therethrough and is provided at its upper end with a nut $c^9$, and the spring of the alarm device is wound up by turning the top or bell portion $c^5$ thereof. The alarm device $c$ may be constructed in any desired manner, or in the same manner as other devices of this class, and independent of the transverse spring arm $c^6$, and the vertically movable rod $g^3$ which operates in connection therewith, said alarm device forms no part of my invention.

That part of the main outer tube $a$ above the bottom portion $a^2$ thereof, in the form of construction shown, is composed of two parts connected at $i$ and the lower end of the bell portion is provided with a flange, rim or collar $i^2$, and the operation of this device will be readily understood from the foregoing description when taken in connection with the accompanying drawings and the following statement thereof.

The tube $c^2$ forms a handle for the device as indicated in Fig. 4, and connected therewith, in practice, is a flexible tube or hose $i^3$ which, in practice, is connected with a tank $i^4$ from which the liquids are to be decanted, and I have also shown at $i^5$ a barrel, cask or keg into which said liquids are to be decanted.

In decanting liquids of any kind or class it is necessary to run off a small quantity from the tank $i$ in order to determine whether or not the liquids entering the cask $i^5$ are clear, and in practice the device is grasped by the tubular handle $c^2$ and the lever $f^6$ is depressed, the valve $i^6$ is then opened and liquids are allowed to flow. The depressure of the lever $f^6$ closes the valve $f^2$ and the liquids pass through the tubular handle $c^2$ into the tube $b$ from which it passes through the tube $c^3$ into the sight testing device $d$.

If the liquids are clear the lower end of the main outer tube $a$ of the decanting device is inserted into the cask $i^5$ through the usual bung hole $i^7$ in the head $i^8$ of said cask, and the lever $f^6$ is released and the said liquids flow into the cask $i^5$. On the other hand if the liquid is not clear when it rises in the testing device $d$ it is allowed to flow into said testing device until it becomes clear and in this operation the testing device may be emptied by simply releasing the lever $f^6$ which opens the valve $f^2$ and allowing the liquid to flow out and then closing said valve by again depressing the lever $f^6$.

It will be understood that the liquids rise in the lower end of the tube $a$ as the cask $i^5$ is filled, and when said cask is filled or approximately so the float $g$ is forced upwardly. In this operation the rod $g^3$ raises the spring arm $c^6$ when the alarm device $c$ is released and the hammer arm $h$ of said alarm device is allowed to operate and notice is thus given that the cask $i^5$ is filled and the valve $i^6$ may then be closed and the decanting device transferred to another cask or receiver, and this operation may be repeated until the tank $i^4$ is entirely emptied of its contents.

From the foregoing description, it will be seen, that the operation of filling the cask $i^5$ is automatic and after the decanting device has been put in operation as above described no further attention thereto is necessary until the cask is filled as indicated by the alarm device.

In the construction shown in Fig. 6 I substitute for the tubes $a$ and $b$ a single tube $j$ provided about midway of its length with an integral or other collar $j^2$ below which is secured a packing sleeve $i^9$ adapted to close the bung hole $i^7$ in the head $i^8$ of the cask $i^5$.

In this construction the tubes $c^2$ and $c^3$ are employed the same as in Fig. 1, but the testing device $d$ which is also employed is not shown in Fig. 6. In this construction the casing $a^6$ at the top of the tube $j$ which takes the place of the tubes $a$ and $b$ in Fig. 1 is provided with a transverse partition $k$ above which is placed a collapsible or bellows receiver $k^2$ with which is connected a vertically arranged rod $k^3$ which takes the place of the rod $g^3$ shown in Fig. 1, and which operates in connection with the spring arm $c^6$ of the alarm device which is not shown in Fig. 6.

Arranged within the tube $j$ and preferably adjacent to the side opposite the tube $c^2$ is an air tube $m$ which passes through the partition $k$ in the casing $a^6$ and communicates with the collapsible receiver $k^2$, and the lower end of which connects with an outlet $m^2$ below the collar or flange $j^2$, and in the opposite side of the tube $j$ is a vent tube or passage $m^3$ which opens through the tube $j$ above the collar or flange $j^2$ as shown at $m^4$ and below said collar or flange as shown at $m^5$. In this form of construction there is a valve seat $n$ in the lower end portion of the tube $j$, and passing vertically through said tube is a valve rod $n^2$ provided at its lower end with a valve $n^3$ adapted to close the opening through the valve seat $n$, and said valve rod passes vertically through the cap $a^5$ and the lever $f^6$ is connected therewith. The operation of this form of construction, in as far as testing the liquids to determine whether or not they are clear, will be the same as with that shown in Fig. 1, but in this form of construction as the cask $i^5$ is filled the air passes out through the vent openings $m^4$ and $m^5$ and as the liquids continue to rise in the cask $i^5$ the air passes out of said cask into and through the tube $m$ and into the collapsible receiver $k^2$, and as the cask is filled the top of the receiver $k^2$ is raised, the rod $k^3$ is operated and the hammer arm of the alarm device is released and the said alarm is operated and notice is thus given that the cask is full and the decanting device may be transferred to another cask or receiver.

It will be understood that the liquids will not pass through the tube $m$ sufficiently to operate the alarm device until the vent opening $m^5$ is closed by the liquids rising in the cask $i^5$. With both forms of construction, it will be seen, that the alarm device $c$ is operated when the cask is filled, and this part of the operation is automatic and no attention thereto is necessary until the alarm device is operated.

I also preferably form in one side of the casing $a^6$ at the top of the tubes $a$ and $j$, or in both forms of construction an opening $o$ adapted to be closed by a rotatable segmental plate $o^2$ provided with a handle $o^3$, and by means of this construction the interior of the said casing may be examined whenever desired.

Although I have shown but two methods or two forms of construction for carrying my invention into effect, it will be understood that I am not limited to the particular forms of construction herein shown and described, and various changes therein and modifications thereof may be made, within the scope of the appended claims, without departing from the spirit of my invention or sacrificing its advantages.

Having fully described my invention, what I claim as new and desire to secure by Letters Patent, is:—

1. In a decanting device, a tube the lower end of which is adapted to be inserted into a cask or other receiver, a supply tube connected with the upper end portion of said tube and adapted to discharge liquid through the lower end of said tube into the cask or other receiver, a valve device in the bottom portion of said tube and adapted to be operated from the top of said tube to cut off the flow of liquid through said tube, a sight testing receptacle placed at one side of the top portion of said tube and connected therewith so that when the valve device is closed the liquid will rise in said tube and pass into the sight testing device.

2. In a decanting device, a tube the lower end of which is adapted to be inserted into a cask or other receiver, a supply tube connected with the upper end portion of said tube and adapted to discharge liquid through the lower end of said tube into the cask or other receiver, a valve device in the bottom portion of said tube and adapted to be operated from the top of said tube to cut off the flow of liquid through said tube, an alarm device mounted on the top of said tube, and means whereby when the liquid rises in the tank or other receiver said alarm device will be operated.

3. In a decanting device, a main tube the lower end of which is adapted to be inserted into a cask or other receiver, a supplemental tube mounted concentrically in and shorter than said main tube, a laterally arranged water supply pipe communicating with the upper end of the supplemental tube, a vertically movable valve device adapted to close the lower end of the supplemental tube, means for operating said valve device from the upper end of the main tube, and a sight testing receptacle in communication with the upper end portion of the supplemental tube.

4. In a decanting device, a main tube the lower end of which is adapted to be inserted into a cask or other receiver, a supplemental tube mounted concentrically in the main tube and shorter than said tube, a supply pipe connected with the upper end of the supplemental tube, a valve device for closing the lower end of the supplemental tube and adapted to be operated from the upper end of the main tube, and an alarm device connected with the upper end of the main tube and adapted to be operated by liquids rising in the main tube in the operation of filling the cask or other receiver.

In testimony that I claim the foregoing as my invention I have signed my name in presence of the subscribing witnesses this 25th day of February 1909.

WILLIAM P. KINSELLA.

Witnesses:
HARRY R. CANFIELD,
C. E. MULREANY.